(12) United States Patent
Iimori et al.

(10) Patent No.: US 7,617,704 B2
(45) Date of Patent: Nov. 17, 2009

(54) WASHING MACHINE

(75) Inventors: Kyoko Iimori, Yao (JP); Mugihei Ikemizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 49 days.

(21) Appl. No.: 11/656,477

(22) Filed: Jan. 23, 2007

(65) Prior Publication Data

US 2007/0186595 A1 Aug. 16, 2007

(30) Foreign Application Priority Data

Feb. 14, 2006 (JP) ............................. 2006-036485
Dec. 19, 2006 (JP) ............................. 2006-340785

(51) Int. Cl.
*D06F 39/02* (2006.01)
*D06F 33/02* (2006.01)
*D06F 29/00* (2006.01)

(52) U.S. Cl. ...................... 68/17 R; 68/23 R
(58) Field of Classification Search ................ 68/17 R, 68/23 R, 140, 142, 23.4
See application file for complete search history.

(56) References Cited

U.S. PATENT DOCUMENTS

| | | | | |
|---|---|---|---|---|
| 3,557,579 | A * | 1/1971 | Marshall | 68/23.5 |
| 4,941,333 | A * | 7/1990 | Blessing | 68/19.2 |
| 2005/0262644 | A1* | 12/2005 | Oak et al. | 8/158 |
| 2006/0185403 | A1* | 8/2006 | Ikemizu et al. | 68/12.18 |

FOREIGN PATENT DOCUMENTS

| | | |
|---|---|---|
| JP | 9-56972 A | 3/1997 |
| JP | 2000-308793 A | 11/2000 |
| JP | 2004-57423 A | 2/2004 |
| JP | 2004-321306 A | 11/2004 |
| JP | 2004-321683 A | 11/2004 |
| WO | WO 2004094716 A1 * | 11/2004 |

OTHER PUBLICATIONS

Electronic translation of WO 2004094716 A1, no date.*
Electronic translation of JP 200457423 A, no date.*

* cited by examiner

*Primary Examiner*—Joseph L Perrin
(74) *Attorney, Agent, or Firm*—Birch, Stewart, Kolasch & Birch, LLP (57) ABSTRACT

Provided is a washing machine that makes it possible to effectively exert a sterilizing effect onto all the inner wall face from a lower portion to an upper portion of a washing tank, to shorten a driving time required for washing the washing tank and also to reduce an amount of water to be used for the washing process. The washing machine is provided with a rotatable washing tank that has no hole in the tank wall, and is formed so that a diameter of the inner wall face becomes gradually greater toward an opening portion, as well as a water supply valve, a water supply pipe and an water supply inlet that serve as a water supply unit capable of supplying water having a sterilizing effect to the washing tank, and in this structure, silver ion-containing water, supplied to the washing tank by the water supply unit, is allowed to move and flow along the inner wall face of the washing tank by the centrifugal force derived from the rotation of the washing tank so as to sterilize the inner wall face of the washing tank.

21 Claims, 6 Drawing Sheets

WASHING MACHINE

BACKGROUND OF THE INVENTION

1. Field of the Invention

The present invention generally relates to a washing machine, and more particularly to a washing machine that has a function for removing microorganisms propagating on an inner wall face of a washing tank with which the laundry comes into contact.

2. Description of the Background Art

When a washing machine carries out washing processes, soap dregs are deposited on an inner wall face of its washing tank. Microorganisms such as bacteria and fungi propagate with the soap dregs serving as a source of nutrition. The portions on which bacteria and fungi propagate basically include all the portions inside the washing tank. Microorganisms propagate not only on a bottom portion of the washing tank with which water is frequently made in contact usually, but also on, for example, portions along a water line on which stains are easily deposited as well as on an upper portion of the washing tank which is located above a water face in the maximum water level and with which water is not frequently made in contact, because water droplets form spray during the washing process and adhere thereto, and because water that has been raised along the inner wall during a dehydrating process remains thereon.

With respect to the portions such as the bottom portion of the washing tank with which water and the laundry are made in contact during the washing process, in the case when the washing process is carried out usually, the propagation of microorganisms is limited since these portions are washed every time the washing process is carried out. However, with respect to the upper portion of the washing tank, since such a washing effect is weak, microorganisms tend to vigorously propagate. When the washing process is repeated under these circumstances, microorganisms are dispersed in the washing water to cause a problem that the laundry is stained. Moreover, when microorganisms propagate in the washing tank, a problem of scattered microorganisms into the living environment might occur, and a visually unpleasant feeling tends to be given to the user. In order to solve these problems, a washing machine provided with a tank washing function has been proposed.

For example, Japanese Patent Application Laid-Open No. 2004-321683 has proposed a washing machine in which: in order to effectively disperse a chemical solution having an antibacterial property onto portions that tend to allow microorganisms to propagate, a rotatable washing tank, a water receiving tank that encloses the washing tank and a chemical solution in which an antibacterial agent has been dissolved are provided, and the chemical solution is scattered by the centrifugal force derived from the rotation of the washing tank to be dispersed onto the outside of the washing tank or the inside of the water receiving tank.

Moreover, Japanese Patent Application Laid-Open No. 9-56972 has proposed a washing machine in which: in order to sufficiently provide a washing effect to the tank, a tank washing course is prepared, and during a water supply process or during a water draining process, the water supply process or the water draining process is suspended at a plurality of stages of water levels that are lower than the final arrival water level to stir the water held in the tank or the water remaining in the tank for a predetermined period of time.

Moreover, Japanese Patent Application Laid-Open No. 2000-308793 has proposed a washing machine in which: in order to cleanly wash the washing tank compatibly used as a spin drier tank in a tank washing course, the washing tank compatibly used as a spin drier tank, which is placed inside an outer tank so as to freely rotate, is provided, and an overflow outlet, which is placed at a position above the water level set in the washing course and used for discharging water that has come to this level, is provided in the outer tank, and during a driving operation of the tank washing course, a pulsator is rotated so that water held inside the outer tank is stirred and thus overflows from the overflow outlet.

The tank washing process, proposed in Japanese Patent Application Laid-Open No. 2004-321683, is provided with a washing machine of a double tank structure provided with an inner washing tank (inner tank) and an outer washing tank (outer tank), and aims at the outer tank so that a chemical solution is dispersed outside the inner tank or inside the outer tank to carry out the washing process. In other words, the chemical solution is dispersed between the inner tank and the outer tank, with the result that no chemical solution is made in contact with the wall face on the inside of the washing tank with which the laundry is directly made in contact. Here, a water holding chamber is prepared separately from the inner tank and the outer tank, and it is necessary to use water in the water holding chamber so as to disperse the chemical solution.

Even in the case when a chemical solution is added to the water inside the inner tank and the outer tank so that the water and the chemical solution are allowed to move and flow along the wall face by the centrifugal force, since through holes are formed in the wall face on the inside of the inner tank, the water and the chemical solution flow out through the through holes, failing to be entirely dispersed over the wall face. Although there is the possibility that, for example, the wall face inside the inner tank, that is, portions near the water line and upper portions thereof, might be subject to propagation of bacteria and fungi, the tank washing processes, proposed in the above-mentioned patent publications, do not allow the chemical solution to make contact with the corresponding portions, thereby failing to properly provide the sterilizing and antibacterial effects.

In a washing machine proposed by Japanese Patent Application Laid-Open No. 9-56972, the water supplying and draining operations are suspended in multiple stages to carry out stirring processes. This system aims to wash portions near the water level by carrying out the stirring processes while the water level is changed step by step. For this reason, in order to wash the upper portion of the washing tank above the maximum water level, the stirring process needs to be carried out at the water level near the maximum water level, causing a large amount of water consumption.

Moreover, since a plurality of washing processes are carried out step by step, the driving time of the washing machine is prolonged, with the result that the corresponding increased power consumption is required. In recent years in which the number of two-income families is increasing, the smaller the time required for laundry washing, the better from the viewpoint of convenience. Under the current trend that the shortened driving time of the washing machine has been demanded from the viewpoints of energy conservation and convenience, prolonging the driving time of the washing machine so as to wash the tank is to swim against the current.

The washing machine, proposed in Japanese Patent Application Laid-Open No. 2000-308793, needs to hold water in the outer tank virtually up to the maximum water level so as to wash the tank, making it necessary to use a large amount of water resource. Consequently, in the current trend of making products that impose little load onto the environment, this washing machine fails to take the environment issue into consideration.

SUMMARY OF THE INVENTION

An object of the present invention is to provide a washing machine that makes it possible to effectively exert a sterilizing effect onto all the inner wall face from the lower portion to the upper portion of the washing tank, to shorten the driving time required for washing the washing tank and also to reduce the amount of water to be used for the washing process.

A washing machine in accordance with the present invention is provided with a rotatable washing tank that has no hole in a tank wall, and is formed so that a diameter of an inner wall face becomes gradually greater toward an opening portion, and a water supply unit capable of supplying water having a sterilizing effect into the washing tank. In other words, the washing tank is formed into a so-called taper-type washing tank with a diameter of an upper opening being made larger than the diameter of a lower portion. Moreover, the washing machine of the present invention features that water having a sterilizing effect, supplied into the washing tank by the water supply unit, is allowed to move and flow along the inner wall face of the washing tank by the centrifugal force derived from the rotation of the washing tank so that the inner wall face of the washing tank is sterilized.

With this structure, the water having a sterilizing effect, supplied into the washing tank, is allowed to move and flow along the entire inner wall face of the so-called taper-type washing tank by the centrifugal force derived from the rotation of the washing tank; therefore, even when a small amount of water is applied as the water having a sterilizing effect, it is allowed to easily reach the uppermost portion of the inner wall face of the washing tank by the centrifugal force. For this reason, soap dregs, microorganisms and the like adhering to the inner wall face of the washing tank can be washed away over the entire inner wall face of the washing tank, and sterilized so that it is possible to eliminate microorganisms such as fungi and bacteria that propagate over the inner wall face of the washing tank, and consequently to prevent contamination of the laundry by the microorganisms adhering to the inner wall face of the washing tank.

In the washing machine of the present invention, it is preferable to supply water into the washing tank while the washing tank is being rotated. At this time, the rotation speed of the washing tank is preferably set to a low speed.

With this arrangement, since, after the rotation of the washing tank has been stabilized, water can be supplied into the washing tank, it is possible to prevent a rotation failure (unbalance) in the washing tank that tends to occur upon starting the rotation of the washing tank in which water has been preliminarily held.

Moreover, in the washing machine of the present invention, it is preferable to discharge water out of the washing tank while the washing tank is being rotated. At this time, the rotation speed of the washing tank is preferably set to a high speed.

With this arrangement, after the water has been allowed to uniformly flow along the inner wall face of the washing tank by the centrifugal force, the unnecessary water can be completely removed from the washing tank.

Moreover, in the washing machine of the present invention, the water having a sterilizing effect is preferably prepared as silver ion-containing water.

With this arrangement, by using the silver ion having superior sterilizing effect and antifungal effect, the inner wall face of the washing tank can be sterilized so that bacteria even once propagated can be removed sufficiently.

In this case, the silver ion-containing water preferably have a silver ion concentration of 450 ppb or more.

Thus, it becomes possible to exert a sufficient sterilizing effect, in particular, to fungi that propagate on the inner wall face of the washing tank of a washing machine.

In accordance with the present invention, since the water having a sterilizing effect, supplied into the washing tank, is allowed to move and flow along the entire inner wall face of the washing tank by the centrifugal force derived from the rotation of the washing tank, soap dregs, microorganisms and the like adhering to the inner wall face of the washing tank can be washed away over the entire wall face of the washing tank, and also sterilized.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Embodiment 1

Figure 1:
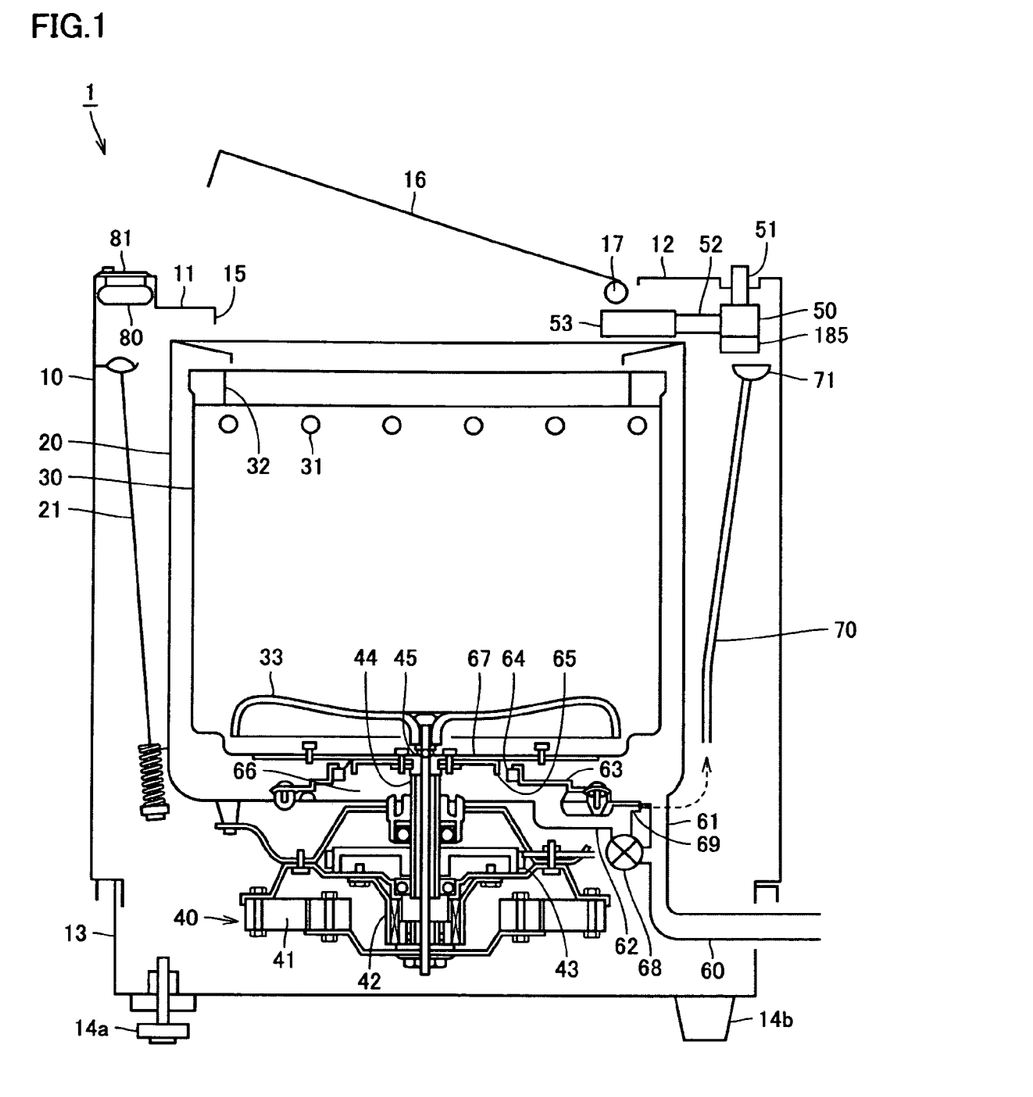
FIG. 1 is a longitudinal cross-sectional view that shows the entire structure of a washing machine in accordance with embodiments of the present invention.

Referring to FIG. 1, the following description will discuss an embodiment of a washing machine as embodiment 1 of the present invention.

First, a structure of a washing machine of the present embodiment is explained. FIG. 1 is a longitudinal cross-sectional view showing the entire structure of a washing machine 1.

As shown in FIG. 1, supposing that a left side of the figure corresponds to a front face of the washing machine 1 and that a right side of the figure corresponds to a back face thereof, a back panel 12, made of synthetic resin, is installed in an overlapping manner on an upper face plate 11 made of synthetic resin in the same manner on the back face side of the washing machine 1. The back panel 12 is secured onto an outer case 10 or the upper face plate 11 with screws. A base 13 made of synthetic resin is superposed on a bottom face opening section of the outer case 10. The base 13 is secured onto the outer case 10 with screws. Here, in FIG. 1, the above-mentioned screws are omitted from the drawing.

Leg portions 14a and 14b used for supporting the outer case 10 on the floor are attached to four corners of the base 13. The leg portions 14a on the front face side are prepared as screw legs capable of variably changing the height. By rotating the leg portions 14a, the level of the washing machine 1 is adjusted. The leg portions 14b on the back face side are fixed legs that are integrally molded with the base 13.

A laundry loading opening 15, used for loading a washing tank 30 to be described later with the laundry, is formed on the upper face plate 11. A lid 16 is coupled to the upper face plate 11 by hinge portions 17, and allowed to pivot within a plane vertical to the upper face plate 11 so that it covers the laundry loading opening 15 from above.

A water tank 20 and the washing tank 30 compatibly used as a dehydrating tank are placed inside the outer case 10. The washing tank 30 corresponds to a washing tank used for washing fiber structured bodies. Both of the water tank 20 and the washing tank 30 have a cylindrical cup shape with an opening in the upper face, and the respective axis lines thereof are extended vertically, and disposed in a manner so as to form concentric circles, with the water tank 20 located outside and the washing tank 30 located inside.

The washing tank 30 is designed so as to become larger in its diameter of the inner wall face toward the opening on the upper portion. In other words, the washing tank 30 has an inner circumferential wall face tilted in a tapered shape that is widened gradually toward the upper portion, that is, more specifically, an inner circumferential wall face having a reversed cone shape. On the tank wall (circumferential wall) of the washing machine tank 30, there is no opening for allowing liquid to pass formed except a plurality of dehydrating holes 31 disposed on the uppermost portion in a ring shape. In other words, the washing tank 30 is formed into a so-called "no-hole" type. A balancer 32 having a ring shape is attached to the edge of the upper opening of the washing tank 30. This balancer 32 has such a function that when the washing tank 30 is rotated at a high speed so as to dehydrate the laundry, it restrains vibration thereof A pulsator 33 used for generating flows of washing water or rinsing water in the tank is disposed on the inner bottom face of the washing tank 30.

Onto the lower face of the water tank 20, a driving unit 40 is attached. This driving unit 40, which includes a motor 41, a clutch mechanism 42 and a brake mechanism 43, has a structure in which a dehydrating shaft 44 and a pulsator shaft 45 protrude upward from the center thereof. The dehydrating shaft 44 and the pulsator shaft 45 are formed into a double axis structure with the dehydrating shaft 44 located outside and the pulsator shaft 45 located inside. The dehydrating shaft 44 is inserted into the water tank 20 upward from below, and then coupled to the washing tank 30 so as to support this. The pulsator shaft 45 is allowed to penetrate the water tank 20 upward from below, and further inserted into the washing tank 30, and then coupled to the pulsator 33 so as to support this. Sealing members used for preventing water leakage are placed respectively between the dehydrating shaft 44 and the water tank 20 as well as between the dehydrating shaft 44 and the pulsator shaft 45. The water tank 20 is suspended inside the outer case 10 by suspension members 21.

A water supply valve 50, which is opened and closed electromagnetically, is placed in a space below the back panel 12. The water supply valve 50 is provided with a connecting pipe 51 that penetrates the back panel 12 and sticks out upward. A water supply hose (not shown) used for supplying service water such as tap water is connected to the connecting pipe 51. Moreover, the water supply valve 50 is connected to a water supply port 53 having a container shape. Thus, a water supply unit for supplying water to the washing tank 30 is constructed.

Figure 2:
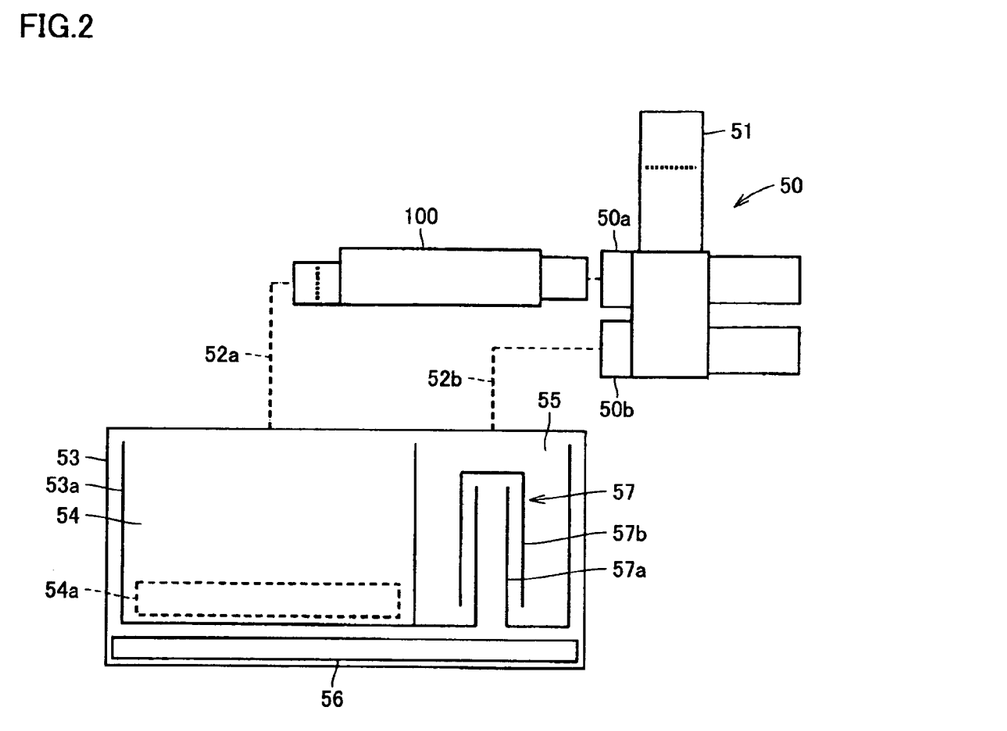
FIG. 2 is a longitudinal cross-sectional view that schematically shows a water supply port in accordance with the embodiments of the present invention.
Figure 3:
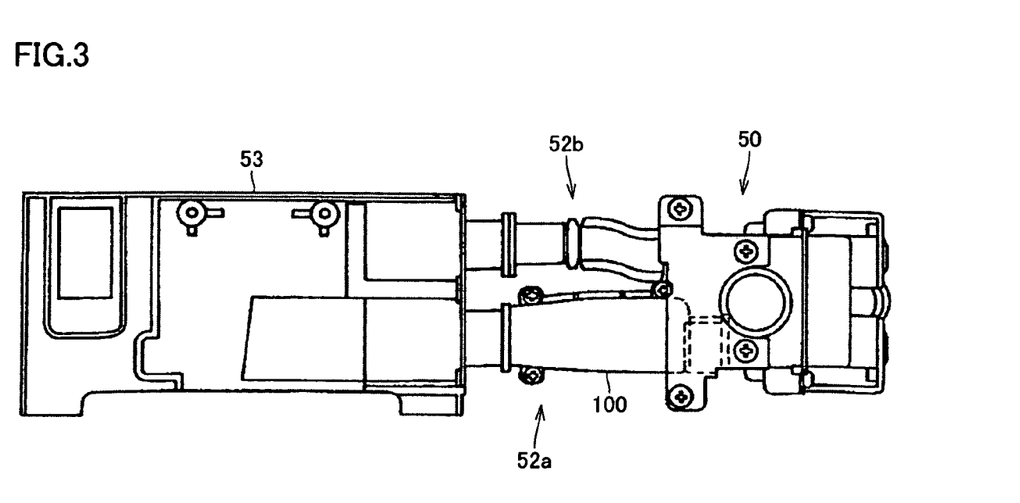
FIG. 3 is a plan view that shows the outside appearance of the water supply port in accordance with the embodiments of the present invention.

FIG. 2 is a longitudinal cross-sectional view that schematically shows the water supply port in accordance with the present embodiment, and FIG. 3 is a plan view that shows the outside appearance of the water supply port in accordance with the embodiment of the present invention.

As shown in FIG. 2, the water supply valve 50 is constituted by a main water supply valve 50a and a sub-water supply valve 50b. The main water supply valve 50a is designed to have a relatively high flow rate, while the sub-water supply valve 50b is designed to have a relatively low flow rate. The high/low setups of the flow rate may be achieved by making the inner structures of the main water supply valve 50a and the sub-water supply valve 50b different from each other, or may be achieved by combining each of the valves having the same valve structure with a flow-rate regulating member having a different drawing rate. The connecting pipe 51 is commonly applicable to both of the main water supply valve 50a and the sub-water supply valve 50b.

The main water supply valve 50a is connected to an opening formed in a ceiling portion of the water supply port 53 through the main water supply pipe 52a via the ion elution unit 100 serving as a metal-ion generation unit. This opening is opened toward a detergent chamber 54. Therefore, water that flows out of the main water supply valve 50a is poured into the detergent chamber 54 from the main water supply pipe 52a.

The sub-water supply valve 50b is connected to an opening formed in a ceiling portion of the water supply port 53 through the sub-water supply pipe 52b. This opening is opened toward a finishing agent chamber 55. The finishing agent chamber 55 is provided with a siphon unit 57 having an inner pipe 57a and an outer pipe 57b. Therefore, water flowing from the sub-water supply valve 50b is poured into the finishing agent chamber 55 from the sub-water supply pipe 52b. In other words, the channel that is directed to the washing tank 30 from the main water supply valve 50a through the detergent chamber 54 and the channel that is directed to the washing tank 30 from the sub-water supply valve 50b through the finishing agent chamber 55 belong to different systems.

Here, a strainer, not shown, is placed in the connecting pipe 51. This strainer is used for preventing foreign matters from entering the water supply valve 50. A water pouring port 54a is formed in the bottom portion of the detergent chamber 54, and a water pouring port 56 is formed in the bottom portion of the water supply port 53. The water supply port 53 is provided with a drawing portion 53a.

As shown in FIG. 1, a drain hose 60, used for draining water inside the water tank 20 and the washing tank 30 out of the outer case 10, is attached to the bottom of the water tank 20. Water from a drain pipe 61 and a drain pipe 62 is allowed to flow into the drain hose 60. The drain pipe 61 is connected to a portion close to the periphery of the bottom face of the water tank 20. In contrast, the drain pipe 62 is connected to a portion close to the center of the bottom face of the water tank 20.

Onto the inner bottom face of the water tank 20, a ring-shaped partition wall 63 is secured in a manner so as to surround the connecting portion of the drain pipe 62 located inside thereof. A ring-shaped sealing member 64 is attached to the upper portion of the partition wall 63. The sealing member 64 is made in contact with the peripheral face of a disk 65 secured to the outer face of the bottom of the washing tank 30 so that an independent draining space 66 is formed between the water tank 20 and the washing tank 30. This draining space 66 is allowed to communicate with the inside of the washing tank 30 through a drain port 67 formed in the bottom of the washing tank 30.

A draining valve 68 that is opened and closed electromagnetically is placed in the drain pipe 62. An air trap 69 is installed at a portion on the upstream side of the draining valve 68 of the drain pipe 62, and a pressure-directing pipe 70 is extended from the air trap 69. A water-level switch 71 serving as a water-quantity detection means for the washing tank 30 or the water tank 20 is connected to the upper end of the pressure-directing pipe 70.

A control unit 80 is installed on the front side of the outer case 10. The control unit 80 is placed beneath the upper face plate 11, and receives operation instructions from the user through an operation/display unit 81 formed on the top face of the upper face plate 11 so that the operation instructions are given to the driving unit 40, water supply valve 50, drain valve 68 and the like. Moreover, the control unit 80 gives display instructions to the operation/display unit 81. Here, a "tank washing course" used for washing the washing tank wall with sterilizing water can be selected by the operation/display unit 81.

On the downstream side of the water supply channel from the main water supply valve 50a, a flow-rate detection means 185 is installed. This flow-rate detection means 185 can be prepared by using a conventionally known flow meter. The flow-rate detection can also be carried out by using calculation processes on a change in water quantity per unit time detected by the water-level switch 71, as well as on time required for a change per unit water quantity. Moreover, without using the flow-rate detection, a structure may be adopted in which by using a valve that allows a flow rate only within a certain range under a generally-used water-supply pressure, the flow rate is set within a certain range.

As described earlier, since the washing tank 30 has the taper shape that is widened upward, as the washing tank 30 rotates, water held in the washing tank 30 is allowed to move and flow along the washing tank wall inside the washing tank 30 and raised by a centrifugal force. When the washing water has reached the upper edge of the washing tank 30, the overflowed washing water is discharged from a water discharging hole 31. The washing water released from the water discharging hole 31, is crushed onto the inner face of the water tank 20, and directed along the inner face of the water tank 20 to be drained toward the bottom portion of the water tank 20. Thus, the washing water is discharged out of the outer case 10 through the drain pipe 61 and the drain hose 60 connected thereto.

As shown in FIGS. 2 and 3, the washing machine 1 is provided with the ion elution unit 100 serving as a metal ion generation unit. As shown in FIG. 2, the ion elution unit 100 is connected to the upstream side of the main water supply pipe 52a. Water containing metal ions generated by the metal ion generation unit is supplied to the washing tank 30 as water that exerts a sterilizing function.

Figure 4:
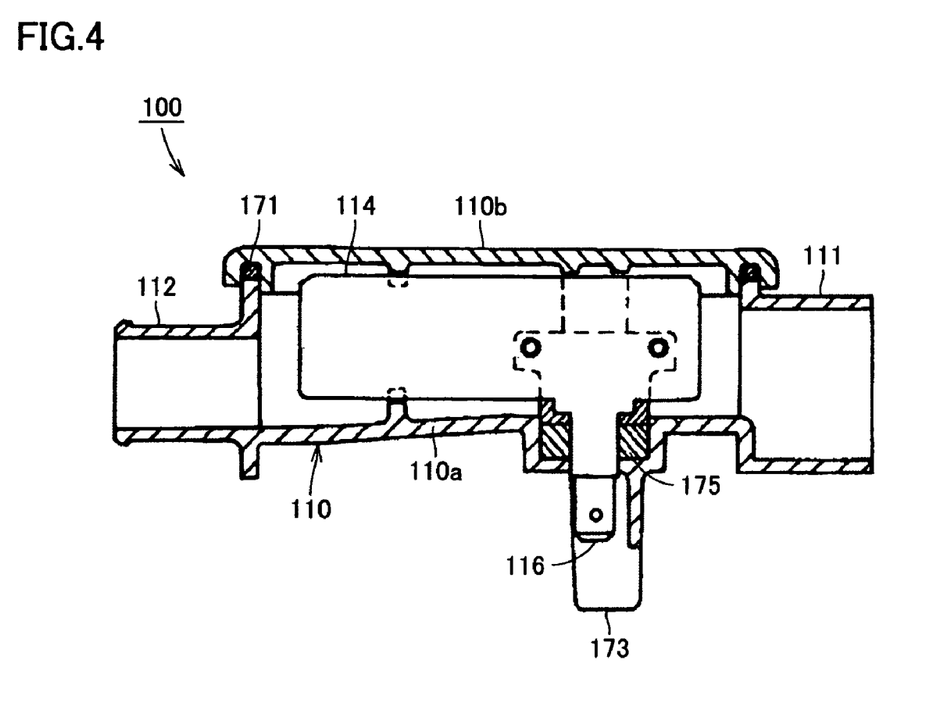
FIG. 4 is a longitudinal cross-sectional view that shows an ion elution unit in accordance with the embodiments of the present invention.
Figure 5:
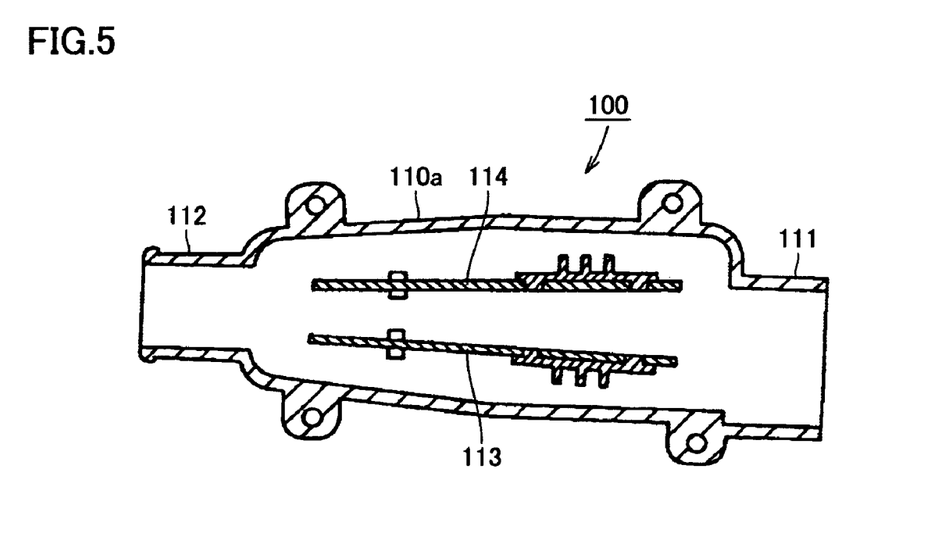
FIG. 5 is a lateral cross-sectional view that shows the ion elution unit in accordance with the embodiments of the present invention.

FIG. 4 is a longitudinal cross-sectional view that shows an ion elution unit in accordance with embodiments of the present invention, and FIG. 5 is a lateral cross-sectional view of the ion elution unit in accordance with embodiments of the present invention.

Referring to FIGS. 3 to 5, the following description will discuss the structure and function of the ion elution unit 100 as well as roles it exerts when installed in the washing machine 1.

FIG. 3 is a partial top view that shows the layout relationship among the water supply valve 50, the ion elution unit 100 and the water supply port 53. The two ends of the ion elution unit 100 are directly connected to the main water supply valve 50a and the water supply port 53. In other words, the ion elution unit 100 is allowed to solely constitute the entire main water supply pipe 52a. The sub-water supply pipe 52b is constituted by coupling a pipe protruding from the water-supply port 53 to the sub-water supply valve 50b with a hose. Here, in the schematic expression of FIG. 1, for convenience of explanation, the water supply valve 50, the water supply pipe 52 (including the ion elution unit 100) and the water supply port 53 are depicted in a manner aligned from the front side to the rear side; however, in an actual washing machine, these are disposed so as to be aligned not from the front side to the rear side, but from the left side to the right side.

As shown in FIG. 4, the ion elution unit 100 is provided with a case 110 made of a transparent or semi-transparent synthetic resin (non-colored or colored), or an opaque synthetic resin. The case 110 is constituted by a case main body 110a having an opening on its top face, and a lid 110b that closes the top face opening. As shown in FIGS. 4 and 5, the case main body 110a has a thin elongated shape, and is provided with a water inlet 111 on one of the sides in the longitudinal direction, and a water outlet 112 on the other side. Each of the water inlet 111 and the water outlet 112 has a pipe shape. The cross-sectional area of the water outlet 112 is smaller than the cross-sectional area of the water inlet 111.

The case 110 is placed with its longitudinal direction aligned with the horizontal direction. As shown in FIG. 4, the bottom face of the case main body 110a horizontally disposed is formed into a tilt face that is gradually lowered toward the water outlet 112. In other words, the water outlet 112 is placed at the lowest position in the inner space of the case 110.

The lid 110b is secured to the case main body 110a with four screws (not shown). A sealing ring 171 is sandwiched between the case main body 110a and the lid 110b.

As shown in FIG. 5, two plate-shaped electrodes 113 and 114 are placed face to face with each other along a water flow from the water inlet 111 to the water outlet 112. When a predetermined voltage is applied across the electrodes 113 and 114 with water located in the case 110, metal ions of the metal forming the electrodes are eluted from the anode side of the electrodes 113 and 114. For example, the electrodes 113 and 114 are prepared as silver plates, each having a size of 2 cm×5 cm and 1 mm in thickness, that are disposed apart from each other with a gap of about 5 mm.

The electrode 113 and its terminal (not shown), as well as the electrode 114 and its terminal 116, are integrally molded by using the same metal element. Electrodes 113 and 114 are directed to protrude from the lower face of the case main body 110a via through holes formed in the bottom wall of the case main body 110a. To a portion where the terminal 116 penetrates the case main body 110a, a water-tight seal is applied. The water-tight seal is allowed to form a double sealing structure together with a sleeve 175 so as to prevent water leakage through this portion.

As shown in FIG. 4, an insulating wall 173 that is spaced apart from the terminal 116 is integrally formed on the lower face of the case main body 110a. The terminal 116 is connected to a driving circuit that belongs to the control unit 80 through a cable, not shown.

The material for the electrodes 113 and 114 is not limited to silver. Any metal may be used as long as it is a source of metal ions having an antibacterial property. With respect to the metal forming the electrodes 113 and 114, besides silver, an alloy of copper and zinc or an alloy of silver, copper and zinc may be used. Silver ions eluted from the silver electrode and zinc ions eluted from the zinc electrode are superior in sterilizing effects, and copper ions eluted from the copper electrode are superior in fungicide property. Moreover, since ions of metal components can be simultaneously eluted from these alloys, it is possible to obtain superior sterilizing effects and fungicide effects.

In the ion elution unit 100, it is possible to select elution/non-elution of metal ions by the presence or absence of the voltage application. Moreover, by controlling the electric current and the voltage applying time, it is possible to control the amount of elusion of metal ions. In comparison with the system in which metal ions are eluted from a metal ion supporting body such as zeolite, this system is more convenient in handling because the selection as to whether or not metal ions should be charged and the adjustment of the concentration of metal ions can be all carried out electrically.

The metal ions, generated in the ion elution unit 100, are charged into the washing tank 30 in the following manner.

When the user selects a "tank washing course" on the operation/display unit 81, metal ion-containing water is supplied to the washing tank 30. Both of the main water supply valve 50a and the sub-water supply valve 50b are opened, water is allowed to flow through both of the main water supply pipe 52a and the sub-water supply pipe 52b. A water flow, which has a predetermined amount of water that is set in the main water supply valve 50a, and greater than the amount of water set in the sub-water supply valve 50b, is allow to run in a manner so as to fill the inner space of the ion elution unit 100. Simultaneously with this process, a voltage is applied across the electrodes 113 and 114 so that ions from the electrode metal ingredient are eluted into the water. When the electrode metal ingredient is silver, a reaction as indicated by formula: $Ag \rightarrow Ag^+ + e^-$ takes place on the electrode on the anode side so that silver ions $Ag^+$ are eluted into water. The electric current flowing between the electrodes is a direct electric current. The water to which the metal ions have been added enters the detergent chamber 54, and is poured into the washing tank 30 through the water pouring port 54a and the water pouring port 56.

When A predetermined amount of metal-ion added water is charged into the washing tank 30 and then metal-ion non-added water is poured to a preset water level, and thus it is determined that the metal ion concentration in rinsing water has reached a predetermined value, the voltage application to the electrodes 113 and 114 is stopped. Even after the ion elution unit 100 has not generated metal ions, the main water supply valve 50a continues to supply water, and when the water level inside the washing tank 30 has reached a predetermined water level, stops the water supply.

Here, in the present embodiment, silver ion-containing water having a silver ion concentration of about 90 ppb is used. As will be described later, in the examples shown in the present embodiments, experiments were carried out by using a silver ion concentration that is effective to bacteria that propagate on the washing tank wall; however, when the target microorganisms are fungus or the like, silver ion-containing water having a higher concentration may be used.

Figure 6:
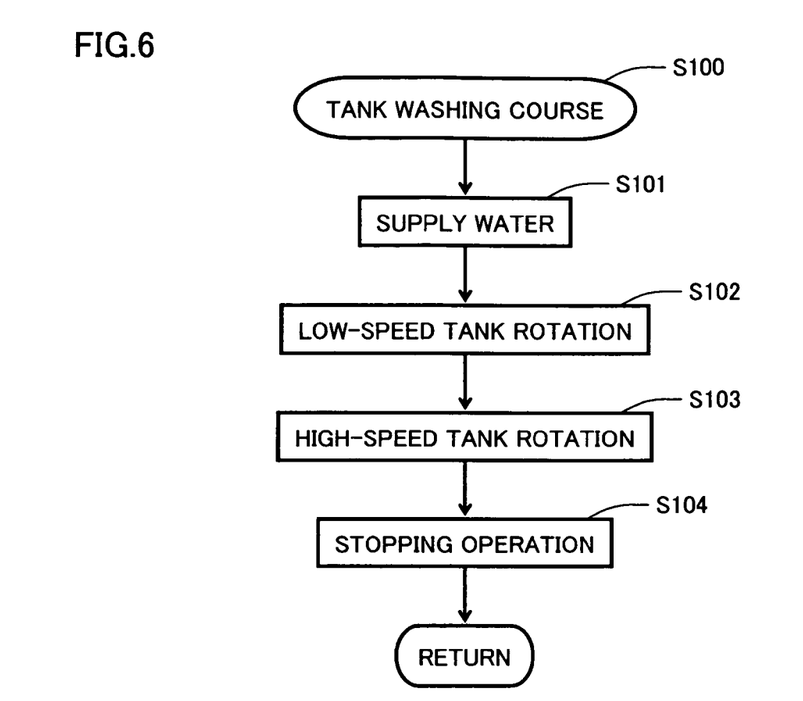
FIG. 6 is a flowchart that shows processes of a tank washing course in accordance with embodiment 1 of the present invention.

FIG. 6 is a flowchart that shows processes of a tank washing course S100 in accordance with embodiment 1 of the present invention.

Referring to FIG. 6, the basic operations in the "tank washing course" will be explained. Upon selection of the "tank washing course" by the user on the operation/display unit 81, a water supply to the washing tank 30 is started in step S101. After the washing tank 30 has been filled with a predetermined amount of water, the washing tank 30 is rotated at a comparatively low speed in step S102 (low speed tank rotations in comparison with tank rotations at a high speed which will be described later), and in step S103, the washing tank 30 is then rotated at a high speed (high speed tank rotations in comparison with the above-mentioned low speed tank rotations). In step S104, a stopping operation, such as a braking operation by cutting a current supply to the motor 41, is carried out.

In the basic operations of the "tank washing course" carried out as described above, the following control operations are carried out in the present embodiment. In other words, the washing tank 30 is filled with silver ion-containing water having a sterilizing effect to a predetermined water level, the rotation movements of the washing tank 30 are started so that the silver ion-containing water kept in the washing tank 30 is allowed to flow along the inner wall face of the washing tank 30 by a centrifugal force, and raised in its level so that soap dregs and microorganisms adhering to the inner wall face of the washing tank are washed away. Here, the control unit 80 mainly carries out determinations on the operations.

In the flowchart of FIG. 6, in the water supplying process in step S101, silver ions are applied to water that has entered the ion elution unit 100 by a driving circuit attached to the control unit 80. The water to which silver ions have been added is charged into the washing tank 30. At this time, the amount of silver ion-containing water to be held in the washing tank 30 may be set to such a small amount as to allow the pulsator to be immersed therein, that is, a water level having a height of about 10 cm from the bottom of the washing tank 30. In the present embodiment, silver ion-containing water of 10 L, that is, not more than ¼ of the maximum water level (44 L), is held in the washing tank 30. After a predetermined amount of the silver ion-containing water has been stored in the washing tank 30, the sequence proceeds to step S102.

In step S102, the washing tank 30 starts rotating. In step S102, the tank is rotated at a lower speed than high-speed tank rotations that will be described later, for example, 100 to 300 rpm. In this case, the silver ion-containing water, held in the washing tank 30, is allowed to flow along the inner wall face of the washing tank 30 and raised so that one portion is sometimes discharged from a plurality of water discharging holes 31 disposed in a ring form on the uppermost portion of the washing tank 30; however, the rest of the water is not discharged for a predetermined period of time, and is made in contact with the inner wall face of the washing tank 30 uniformly. Moreover, by rotating the washing tank 30 at a lower speed, it is also possible to prolong the contact time between the silver ion-containing water and the inner wall face. The silver ion-containing water that has reached the uppermost portion of the inner wall face of the washing tank 30 is discharged through the water discharging holes 31 disposed in a ring form on the uppermost portion of the washing tank 30.

After the silver ion-containing water has been made in contact with the inner wall face of the washing tank 30 uniformly, the tank is rotated at a high speed in step S103. In the present embodiment, the time of the low-speed tank rotation is set to about 15 seconds. In short, it is only necessary for the silver ion-containing water to be made in contact with a treatment portion to be sterilized (inner wall face of the washing tank) uniformly.

In step S103, the washing tank 30 is switched from its low-speed tank rotation to its high-speed tank rotation, and allowed to rotate at a high speed. In the high-speed tank rotation, the tank is rotated at a higher speed than the above-mentioned low-speed tank rotation, that is, for example, in a range from 800 to 1200 rpm so that the silver ion-containing water is discharged from the water discharging holes 31 on the uppermost portion. At this time, the silver ion-containing water that has been splashed from the water discharging holes 31 is sprayed vigorously onto the inside face of the water tank 20 placed on the outside of the washing tank 30 to collide with the inside face of the water tank 20 to form finer water droplets, which cover the outside wall face of the washing tank 30. In this manner, both of the inside and outside wall faces of the washing tank 30 as well as the inside face of the water tank 20 are sterilized.

Here, the drain valve 68 is opened simultaneously so that the silver ion-containing water in the washing tank 30 is discharged through the draining space 66. The drain valve 68 is kept open during the high-speed tank rotation.

The high-speed tank rotation is carried out so as to completely remove the silver ion-containing water in the washing tank 30 from the washing tank 30. In the present invention, the time of this operation is set to about 120 seconds. Upon completion of the high-speed tank rotation, the sequence proceeds to a stopping process in step S104.

In the stopping process of step S104, a stopping operation, such as a braking operation by cutting a current supply to the motor 41, is carried out.

In the present embodiment, 10 L of silver ion-containing water is used as water having a sterilizing function, and in comparison with the generally-used conventional washing method for the washing tank, this method is advantageous in that the amount of water to be used is very small. In other words, the conventional method is generally required to fill the washing tank with full of water; however, in the present embodiment, a small amount of silver ion-containing water is allowed to move and flow by the centrifugal force derived from the rotation of the washing tank, and made in contact with the inner wall face of the washing tank uniformly.

Here, the reason that the silver ion-containing water is uniformly made in contact with the inner wall face of the washing tank by using such a driving operation is because the washing tank is formed into a so-called "taper type" and also a so-called "non-perforation type".

One of the advantages of the taper type washing tank is that, when the washing tank is rotated, water having a sterilizing function, held in the washing tank, is easily allowed to flow and rise upward by the centrifugal force. In other words, the water having a sterilizing function is allowed to reach the upper portion of the inner wall face of the washing tank, and the water having a sterilizing function is also kept in the contact state with the inner wall face, so that it is possible to ensure the sterilizing effect to be exerted onto the inner wall face.

Moreover, in general, a washing machine is provided with a washing tank (inner tank) on the inside and a water tank (outer tank) on the outside, that is, a double tank structure, with a through hole that communicates with the outer tank being formed in the inner tank. For this reason, even if the water having a sterilizing function is allowed to flow and move by the centrifugal force derived from the rotation of the washing tank, the water is discharged toward the outer tank through the through hole, with the result that it is not possible to make the water having a sterilizing function in uniformly contact with the inner wall face of the washing tank. In other words, in the case of the washing machine having the double tank structure, with a through hole that communicates with the outer tank being formed in the inner tank, it is not possible to allow a small amount of water having a sterilizing function to reach the upper portion of the inner wall face of the washing tank. Consequently, in the case of the generally-used washing machine with the double structure, the washing machine needs to be filled with full of water. In contrast, in the washing machine of the present invention, since the "non-perforation type" washing tank is used, it is possible to carry out a sterilizing operation on the inner wall face of the washing tank by the use of a small amount of water, by utilizing the centrifugal force derived from the rotation of the washing tank.

Additionally, the above-explained tank washing course may be carried out in place of the final dehydrating process or the like of the normal washing course with the laundry loaded therein. In this case, upon carrying out the tank washing course in place of the dehydrating process, the high-speed tank rotation to be carried out in step S103 may be set to the period of time in which the dehydration of the laundry can be applied. However, it is more preferable to carry out the tank washing course as an independent process without the laundry because the water having a sterilizing function and the washing tank are positively made in contact with each other, and because the material having a sterilizing function can be selected without the need for taking into consideration the influence to the laundry. When the tank washing course is carried out as an independent process, if the amount of use of water is high, a problem arises from the viewpoint of conservation of resources; however, the present invention is free from such a problem since the amount of use of water is very small.

Embodiment 2

Figure 7:
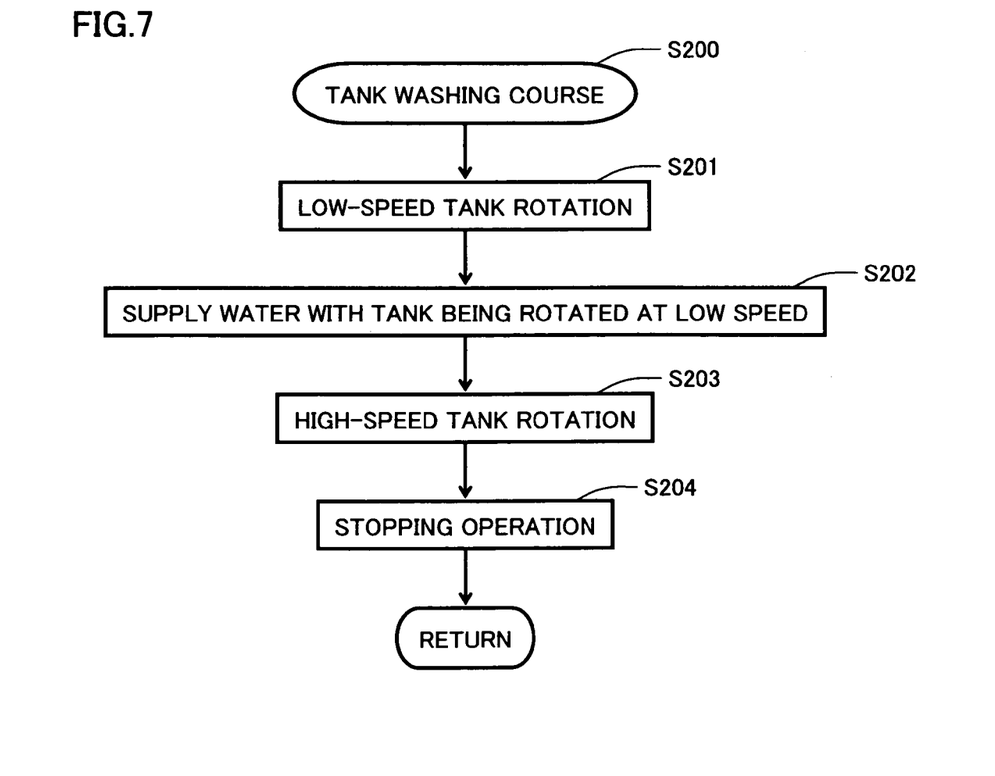
FIG. 7 is a flowchart that shows processes of a tank washing course in accordance with embodiment 2 of the present invention.

FIG. 7 shows an example in which the control process in the "tank washing course" is different from that of the above-mentioned embodiment 1 as embodiment 2 of the present invention. In this embodiment, as shown in FIG. 7, after the washing tank 30 has started the tank rotation at a low speed, silver ion-containing water is supplied to the washing tank 30. The other processes are the same as those of embodiment 1.

By carrying out the tank washing course in accordance with the present embodiment, unbalance that tends to occur in the initial state of the tank rotation can be restrained. When water is held in the washing tank upon starting the tank rotation, load unbalance tends to occur in the entire washing tank due to the weight of the water, resulting in a failure in the driving. This is referred to as "unbalance". However, in the case when, after the tank rotation has been started prior to the supply of water, the water is then supplied, the tank rotation can be maintained in a stable manner so that the "unbalance" can be prevented.

Embodiment 3

Figure 8:
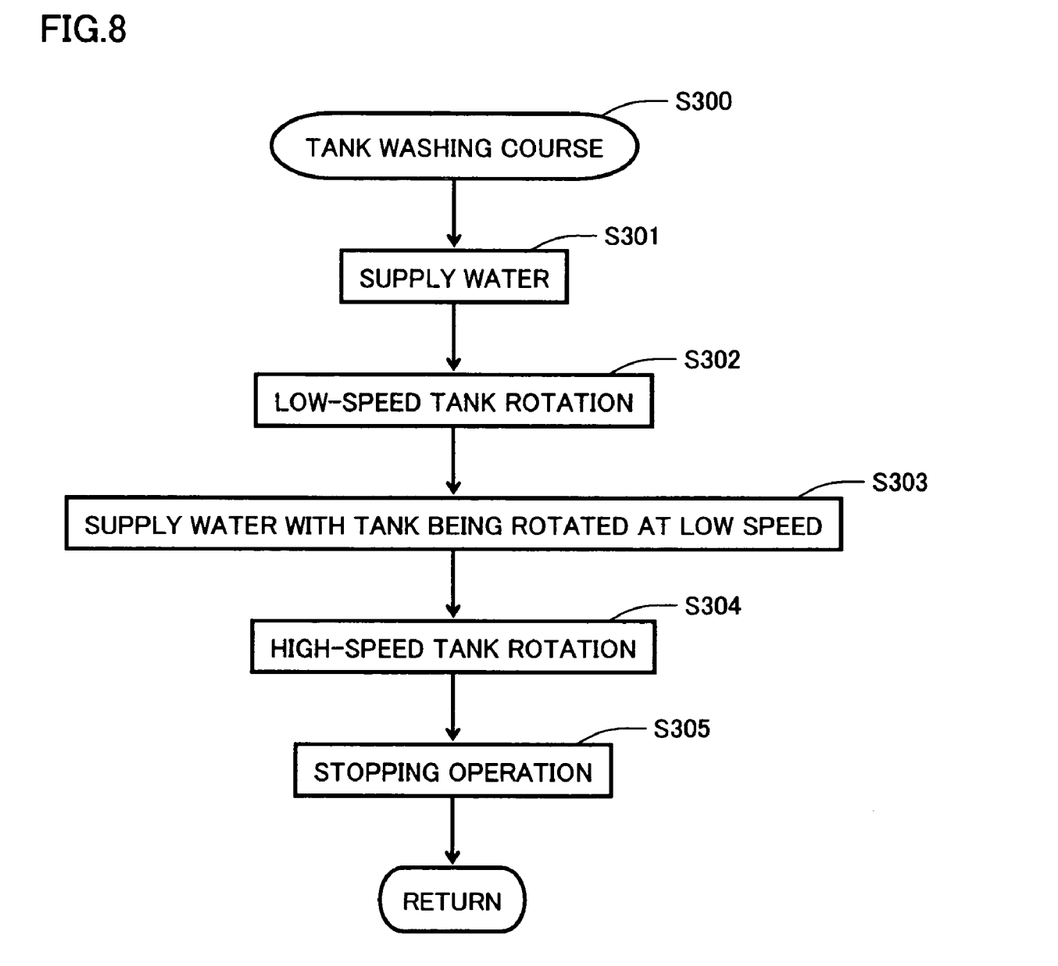
FIG. 8 is a flowchart that shows processes of a tank washing course in accordance with embodiment 3 of the present invention.

FIG. 8 shows another example in which the control process in the "tank washing course" is different from that of the above-mentioned embodiment 1 as embodiment 3 of the present invention. In this embodiment, as shown in FIG. 8, first, silver ion-containing water having a sterilizing function is supplied to the washing tank 30, and after the washing tank 30 has started the tank rotation at low speed, the silver ion-containing water is again supplied to the washing tank 30. The other processes are the same as those of embodiment 1.

In embodiment 1, although no unbalance occurred when 10 L of water was held in the washing tank, unbalance occurred when 15 L of water was held in the washing tank. In other words, depending on the amount of water held in the washing tank, the possibility of unbalance is raised. In embodiment 3, in the case when a certain amount of water is required due to the size of the washing tank, a comparatively small amount of silver ion-containing water is first held, and the tank rotation is started in this state, and after the tank rotation has been stabilized, the silver ion-containing water is added so as to attain a predetermined amount of water.

Moreover, the rotation speed at the low-speed tank rotation in step S302 is set to such a speed as to allow the silver ion-containing water to be slowly discharged from the water discharging holes in the uppermost portion, and in this state, by supplying the silver ion-containing water to the washing tank, it becomes possible to carry out the tank washing while using a large amount of silver ion-containing water, and consequently to increase the sterilizing effect although the amount of use of water is increased.

Although the present invention has been described on preferred embodiments 1 to 3, it is to be understood that while the structures described in the above embodiments illustrate the present invention, they are exemplary only, that is, specific structures of the washing machine, specific shapes, structures and installation positions of the silver ion elution unit, are all exemplary only, and the present invention is not intended to be limited thereby. Therefore, the scope of the present invention is to be limited not by the above-mentioned embodiments, but only by the appended claims, and various changes and modifications thereof are not to be regarded as a departure from the spirit and scope of the invention, and all such modifications are intended to be included within the scope of the appended claims.

EXAMPLES

The following description will discuss specific effects obtained by embodiment 1 of the present invention based upon experimental data.

Figure 9:
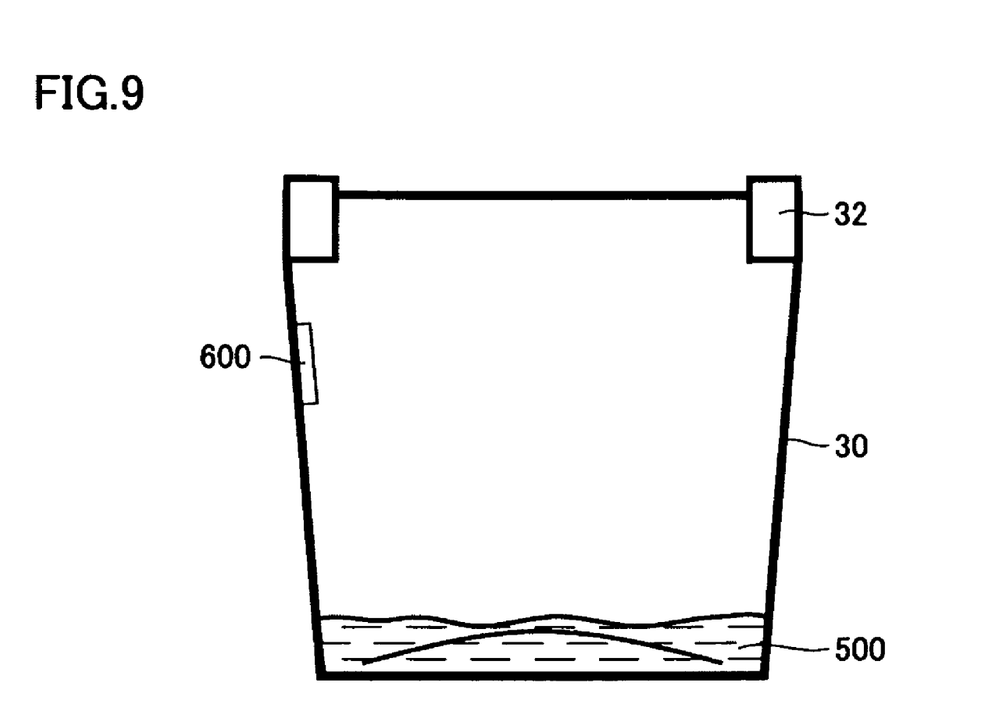
FIG. 9 is a longitudinal cross-sectional view that shows an inner wall of a washing machine that was used in experiments for confirming a sterilizing effect in the embodiments of the present invention.

FIG. 9 is a longitudinal cross-sectional view that shows an inner wall of a washing tank that was used in experiments that were carried out to confirm the sterilizing effect in examples of the present invention.

Silver ion-containing water having a silver ion concentration of 90 ppb was held in a washing tank 30 and the aforementioned "tank washing course" was executed.

First, the following description will discuss the reason for the use of silver ion-containing water having a silver ion concentration of 90 ppb based upon the following experimental data.

In this experiment, bacteria were added to silver ion-containing water having a varied silver ion concentration, and it was confirmed how much degree of the silver ion concentration in the silver ion-containing water would start exerting the effect to the bacteria. Two samples of silver ion-containing water having silver ion concentrations of 30 ppb and 90 ppb, and tap water containing no silver ions were prepared, and *Pseudomonas aeruginosa* was added to these silver ion-containing water and tap water as bacteria. The number of *Pseudomonas aeruginosa* in each of water samples was set to $3.2 \times 10^4$ pieces/ml, and 10 minutes later, the change in the number of *Pseudomonas aeruginosa* in each of the water samples was confirmed. The results are shown in Table 1.

TABLE 1

| Silver ion concentration | Initial state | 10 minutes later | Bacteriostatic action value |
|---|---|---|---|
| 0ppb(Tap water) | $3.2 \times 10^4$ | $3.0 \times 10^4$ | 0 |
| 30ppb | $3.2 \times 10^4$ | $1.4 \times 10^3$ | 1.3 |
| 90ppb | $3.2 \times 10^4$ | $3.0 \times 10^2$ | 2.0 |

As indicated by the results shown in Table 1, 10 minutes later, the numbers of *Pseudomonas aeruginosa* in the respective water samples were: $1.4 \times 10^3$ pieces/ml in silver ion-containing water having a silver ion concentration of 30 ppb; $3.0 \times 10^2$ pieces/ml in silver ion-containing water having a silver ion concentration of 90 ppb; and $3.0 \times 10^4$ pieces/ml in tap water. When these results were converted to logarithm values so that the bacteriostatic action value indicating the sterilizing effect was found from the logarithm value of the number of bacteria in the initial state, the resulting values were: 1.3 in the silver ion-containing water having a silver ion concentration of 30 ppb; and 2.0 in the silver ion-containing water having a silver ion concentration of 90 ppb. Here, the sterilizing effect was determined based upon the standard of the National Domestic Electric Appliances Fair Trade Commission in which "when the number of "bacteria", after operations and treatments given for restraining the growth, development and action, indicates a reduced value difference by 2.0 or more (=99% or more) in the logarithm value in comparison with the number of "bacteria" to which neither such operations nor such treatments had been given, it is assumed that the effect be confirmed."

The above-mentioned experiments indicate that the silver ion concentration that allows the silver ion-containing water to start exerting the effect on bacteria in a short period of time is 90 ppb. Based upon the experimental results, 90 ppb that is the minimum limit of silver ion concentration required for exerting the sterilizing effect is adopted in the present embodiment.

In the present embodiment, first, silver ion-containing water having a silver ion concentration of 90 ppb as described above was held in the washing tank 30, and filter paper 600 infiltrated with a bacteria solution was affixed to the inner wall face of the washing tank 30. The filter paper 600 was formed so as to simulate bacteria adhering to the inner wall face of the washing tank 30. With respect to the filter paper 600, six pieces thereof were affixed thereto at a height of about 30 cm from the bottom of the washing tank 30. The change in the number of bacteria adhering to the filter paper 600 was confirmed before and after the driving operation of the tank washing course. Here, in the following data on the number of bacteria, the average value of the three pieces of filter paper was given. The sizes of the respective pieces of filter paper were all the same. Table 2 shows the change in the number of bacteria per piece of filter paper before and after the driving operation of the tank washing course.

TABLE 2

| | | Silver ion-containing water | Tap water |
|---|---|---|---|
| Initial number of bacteria | | $8.2 \times 10^5$ | |
| After tank washing course | Number of bacteria after tests | $5.7 \times 10^2$ $3.8 \times 10^2$ | $1.5 \times 10^5$ $1.4 \times 10^5$ |
| | Sterilizing effect | 3.8 3.7 | 0.8 0.8 |

In order to measure the number of bacteria before the driving operation of the tank washing course, a bacteria solution was applied to three pieces of filter paper, and the average value of the number of bacteria was found to be $8.2 \times 10^5$ pieces per filter paper. Next, after the driving operation of the tank washing course, the number of bacteria was found to be $5.7 \times 10^2$ pieces per filter paper and $3.8 \times 10^2$ pieces per filter paper.

When these results were converted to logarithm values so that the sterilizing effect was found from the logarithm value of the number of bacteria in the initial state, 3.8 and 3.7 were obtained. Here, the sterilizing effect indicated here was obtained based upon the standard of the National Domestic Electric Appliances Fair Trade Commission in which "when the number of "bacteria" after operations and treatments given for restraining the growth, development and action, indicates a reduced value difference by 2.0 or more (=99% or more) in the logarithm value in comparison with the number of "bacteria" to which neither such operations nor such treatments had been given, it is assumed that the effect be confirmed." Here, in this standard, the "state to which neither such operations nor such treatments had been given" can be interpreted as both of the meanings, that is, "contrast test" to a certain treatment or "the state to which no treatments had been given"; however, in the present specification, the "state to which neither such operations nor such treatments had been given" indicates the results of the experiment in "the state to which no treatments had been given" (initial number of bacteria).

The above-mentioned test results show that, even if bacteria have been developed on the inner wall face of the washing tank, the bacteria can be sterilized by carrying out the tank washing course of the present invention.

Here, Table 1 also shows the results of a test on the change in the number of bacteria obtained when the tank washing course was carried out by using tap water without using silver ion-containing water. This test result also indicates that, since the number of bacteria was decreased even when the tank washing course was carried out by using tap water, the sterilizing effect can be obtained even by the use of tap water. However, it indicates that the use of silver ion-containing water makes it possible to obtain a higher sterilizing effect.

Moreover, although the portions to which the pieces of filter paper were affixed were located at positions higher than the level of water held in the tank washing course, the number of bacteria was reduced by carrying out the tank washing course; therefore, this indicates that the silver ion-containing water was positively made in contact with the respective portions of the inner wall face of the washing tank. This consequently indicates that even when water is not held in a manner so as to come into contact with the sterilizing portions, even a small amount of water can sterilize the corresponding sterilization portions by the driving process of the tank washing course.

Next, the following experiments were carried out so as to find out a silver ion concentration that is preferably used for exerting a sterilizing effect on fungi.

Agar cultures in which sodium oleic acid that is a surfactant used for a detergent and silver ions were mixed were produced, and the number of colonies of fungi formed and scattered on each culture was examined. With respect to the fungi, three kinds of fungi, that is, *Scolecobasidium, Exophiala* and *Cladosporium*, were used. The concentration of sodium oleic acid was set to 0.1%, and the concentrations of silver ions were set to 0 ppb, 90 ppb, 450 ppb and 900 ppb; thus, four kinds of agar cultures were prepared. In the experiment using Exophiala as fungi, however, PDA (Potato Dextrose Agar) was used in place of sodium oleic acid.

Table 3 shows the results of the experiments. In Table 3, the value, obtained by dividing the number of colonies of fungi in the agar culture having a silver ion concentration of 0 ppb by each of the numbers of colonies in the agar cultures having the respective silver ion concentrations, was converted to a logarithm value having two effective digits; thus, when the resulting value is in a range from 0 to 1.9, this state is determined as x, when it is in a range from 2.0 to 3.9, this state is determined as Δ, and when it is 4.0 or more, this state is determined as ○. For example, when the number of colonies of fungi is reduced to 1/100 by silver ions, the above-mentioned value becomes 2.0, which is determined as Δ.

TABLE 3

| Silver ion concentration (ppb) | Scolecobasidium | Exophiala | Cladosporium |
|---|---|---|---|
| 90 | x | x | x |
| 450 | ○ | ○ | Δ |
| 900 | ○ | ○ | ○ |

The results shown in Table 3 indicate that, when silver ion-containing water having a silver ion concentration of 900 ppb is used, a superior sterilizing effect can be obtained.

Moreover, with respect to Scolecobasidium and Exophiala that are supposed to be commonly seen in the washing machine, a sufficient sterilizing effect is obtained even by the use of silver ion-containing water having a silver ion concentration of 450 ppb.

Here, as described earlier, with respect to bacteria, a sufficient sterilizing effect is exerted even by the use of a silver ion concentration of 90 ppb. By further raising the silver ion concentration to 450 ppb or more, a sufficient sterilizing effect is exerted not only on bacteria, but also on fungi.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A washing machine comprising:
   a rotatable washing tank having no hole in a tank wall and formed in a diameter of an inner wall face becoming gradually greater toward an opening portion;
   a water supply unit containing an ion elution unit generating water containing metal ions and supplying said water containing metal ions into said washing tank; and
   a controller that rotates said washing tank at a first speed while maintaining the water containing metal ions supplied by said water supply unit in the washing tank to sterilize the inner wall face of said washing tank by allowing the water to flow along and up to an uppermost portion of the inner wall face of said washing tank by a centrifugal force derived from a rotation of said washing tank, and thereafter rotates said washing tank at a second speed, higher than the first speed, to discharge the water from said washing tank.

2. The washing machine according to claim 1, wherein the water containing metal ions is supplied into said washing tank while said washing tank is rotated.

3. The washing machine according to claim 1, wherein the water containing metal ions is discharged from said washing tank while said washing tank is rotated.

4. The washing machine according to claim 1, wherein the water containing metal ions is silver ion-containing water.

5. The washing machine according to claim 4, wherein the silver ion-containing water has a silver ion concentration of 450 ppb or more.

6. An apparatus for sterilizing a rotatable washing tank of a washing machine, comprising:
   a control unit configured to perform the method of:
      supplying water having a sterilizing effect to said rotatable washing tank having no hole in a tank wall and formed in a diameter of an inner wall face becoming gradually greater toward an opening; and
      rotating said rotatable washing tank at a first speed while maintaining the water having a sterilizing effect, supplied in said supplying step, in said rotatable washing tank to sterilize the inner wall face of said washing tank by allowing the water to flow along and up to an uppermost portion of the inner wall face of said washing tank by a centrifugal force derived from a rotation of said rotatable washing tank, and
      rotating said rotatable washing tank at a second speed, higher than the first speed, to discharge the water from said rotatable washing tank.

7. The apparatus according to claim 6, wherein said control unit rotates said rotatable washing tank at a low-speed after said rotatable washing tank has been supplied with a predetermined amount of water having a sterilizing effect; and rotates said rotatable washing tank at a high-speed.

8. The apparatus according to claim 7, wherein said first speed is 100 to 300 rpm.

9. The apparatus according to claim 7, wherein said second speed is 800 to 1200 rpm.

10. The apparatus according to claim 6, wherein said control unit rotates said rotatable washing tank at a low-speed;
supplies water having a sterilizing effect to said rotatable washing tank while said rotatable washing tank is rotating at low-speed; and
rotates said rotatable washing tank at a high-speed.

11. The apparatus according to claim 10, wherein said first speed is 100 to 300 rpm.

12. The apparatus according to claim 10, wherein said second speed is 800 to 1200 rpm.

13. The apparatus according to claim 6, wherein said control unit supplies water having a sterilizing effect to said rotatable washing tank;
rotates said rotatable washing tank at a low-speed;
supplies water having a sterilizing effect to said rotatable washing tank while rotatable washing tank is rotating at low-speed; and
rotates said rotatable washing tank at a high-speed.

14. The apparatus according to claim 13, wherein said first speed is 100 to 300 rpm.

15. The apparatus according to claim 13, wherein said second speed is 800 to 1200 rpm.

16. The apparatus according to claim 6, wherein the water having a sterilizing effect is silver ion-containing water.

17. The apparatus according to claim 16, wherein the silver-ion containing water has a silver ion concentration of 450 ppb or more.

18. The apparatus according to claim 6, wherein the water having a sterilizing effect is water containing metal ions with an antibacterial property.

19. The apparatus according to claim 6, wherein said control unit discharges said water having a sterilizing effect from said rotatable washing tank while rotating said rotatable washing tank.

20. The apparatus according to claim 6, further comprising:
an operation display unit coupled to said washing machine from which a tank washing course is selected.

21. The apparatus according to claim 6, wherein said control unit applies voltage across electrodes so that ions from an electrode metal ingredient are eluted into water.

* * * * *